US010657711B2

(12) United States Patent
Gonzalez Aguirre

(10) Patent No.: US 10,657,711 B2
(45) Date of Patent: May 19, 2020

(54) SURFACE RECONSTRUCTION FOR INTERACTIVE AUGMENTED REALITY

(71) Applicant: Intel Corporation, Santa Clara, CA (US)

(72) Inventor: David Israel Gonzalez Aguirre, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/210,818

(22) Filed: Dec. 5, 2018

(65) Prior Publication Data

US 2019/0114833 A1    Apr. 18, 2019

(51) Int. Cl.
*G06T 17/20*    (2006.01)
*G06T 7/50*    (2017.01)
*G06T 5/00*    (2006.01)
*G06T 19/00*    (2011.01)

(52) U.S. Cl.
CPC .............. *G06T 17/20* (2013.01); *G06T 5/002* (2013.01); *G06T 7/50* (2017.01); *G06T 19/006* (2013.01); *G06T 2207/20076* (2013.01); *G06T 2207/20192* (2013.01)

(58) Field of Classification Search
CPC .. G06T 17/20; G06T 7/50; G06T 5/00; G06T 5/002; G06T 19/00; G06T 17/00; G06T 15/10; G06T 3/4007; G06T 15/80; G06T 3/403; G06T 5/001; G06T 11/001
See application file for complete search history.

(56) References Cited

PUBLICATIONS

"Mesh Segmentation", The Computational Geometry Algorithms Library, <cgal.org>, retrieved on Nov. 6, 2018, 3 pages.
Murray Rosenblatt, "Remarks on Some Nonparametric Estimates of a Density Function", Nonparametric Estimates, JSTOR, Apr. 27, 1955, pp. 832-837.
Jianning Wang et al., "A Hole-Filling Strategy for Reconstructions of Smooth Surfaces in Range Images", 16th Brazilian Symposium on Computer Graphics and Image Processing, 2003, 8 pages.
Burkhard Wunsche, "A Survey and Evaluation of Mesh Reduction Techniques", Department of Computer Science, University of Auckland, 6 pages.
"OpenCV", OpenCV Library, <opencv.org>, retrieved on Nov. 6, 2018, 2 pages.
"Point Cloud Library", PCL—Point Cloud Library (PCL), <pointclouds.org>, retrieved on Nov. 6, 2018, 2 pages.

(Continued)

*Primary Examiner* — Todd Buttram
(74) *Attorney, Agent, or Firm* — Green, Howard & Mughal LLP.

(57) ABSTRACT

An embodiment of a semiconductor package apparatus may include technology to perform depth sensor fusion to determine depth information for a surface, smooth the depth information for the surface and preserve edge information for the surface based on adaptive smoothing with self-tuning band-width estimation, iteratively remove holes from the surface based on conditional iterative manifold interpolation, reduce one or more of a file size and an on-memory storage size of data corresponding to the surface based on triangular edge contraction, and construct at least a portion of a 3D model based on data corresponding to a visible portion of the surface. Other embodiments are disclosed and claimed.

25 Claims, 13 Drawing Sheets

(56) References Cited

PUBLICATIONS

Li Yao et al., "Quadratic Error Metric Mesh Simplification Algorithm Based on Discrete Curvature", Mathematical Problems in Engineering, vol. 2015, Apr. 1, 2015, 5 pages.

B.W. Silverman, "Density Estimation for Statistics and Data Analysis", Monographs on Statistics and Applied Probability, London: Chapman & Hall, 1986, 22 pages.

$$\vec{P}'_K(x) = \frac{\sum_y^{U_{\mu+\sigma}(x)} K_{\mu+\sigma}(\vec{P}_K(x) - \sum_y^{U_{\mu+\sigma}(x)} K_{\mu+\sigma}(\vec{P}_K(x) - \vec{P}_K(y)) \cdot T(x,y) \cdot \vec{P}_K(y)}{\sum_y^{U_{\mu+\sigma}(x)} K_{\mu+\sigma}(\vec{P}_K(x) - \vec{P}_K(y)) \cdot T(x,y)}$$

Smooth Point — Global Band width set — Local-adaptive weighting kernel — Support Point Kernel normalization

FIG. 9

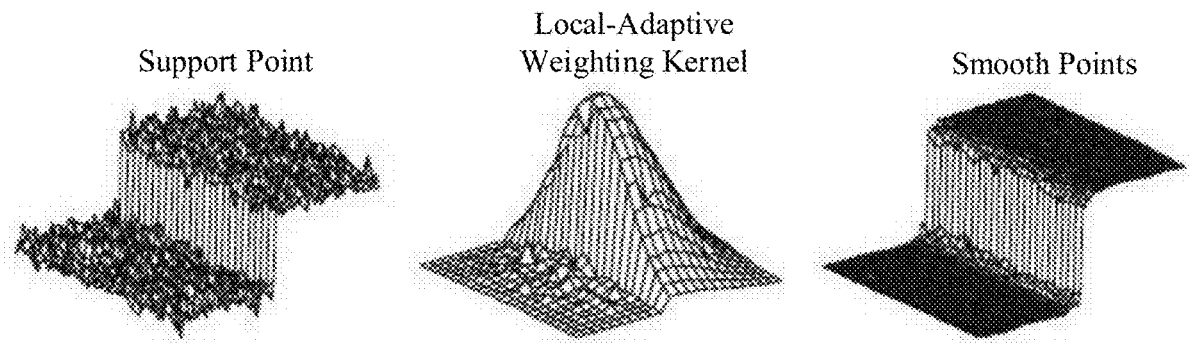

Support Point     Local-Adaptive Weighting Kernel     Smooth Points

FIG. 10A     FIG. 10B     FIG. 10C

$$\vec{P}''_K(x) = \frac{\sum_y^{U_\omega^\uparrow(x)} K_\omega(\vec{P}'_K(x) - \vec{P}'_K(y)) \cdot Q(y) \cdot \vec{P}'_K(y)}{\sum_y^{U_\omega^\uparrow(x)} K_\omega(\vec{P}'_K(x) - \vec{P}'_K(y)) \cdot Q(y)}$$

Interpolated Point — Ordered — Interpolation weighting kernel — Selector — Poles Interpolation Weighting Normalization

FIG. 11

Hole Zone

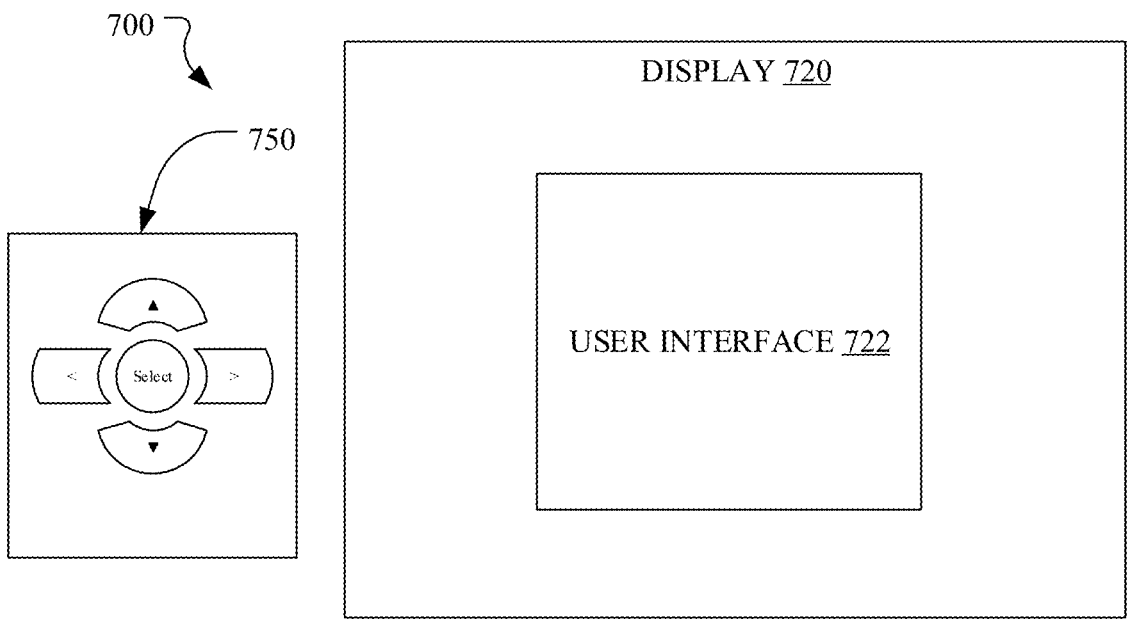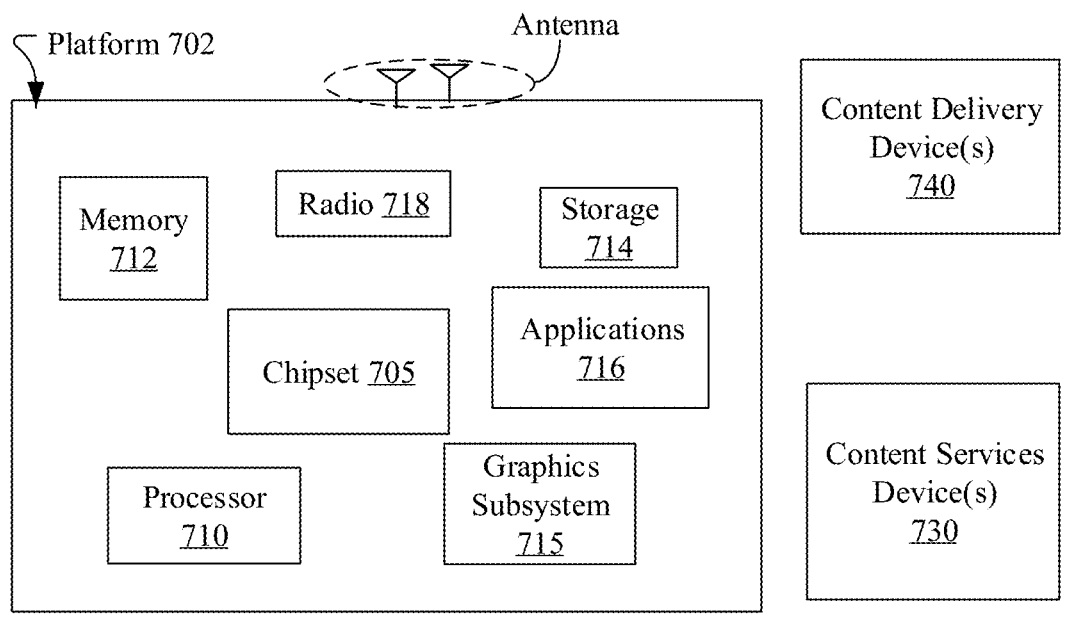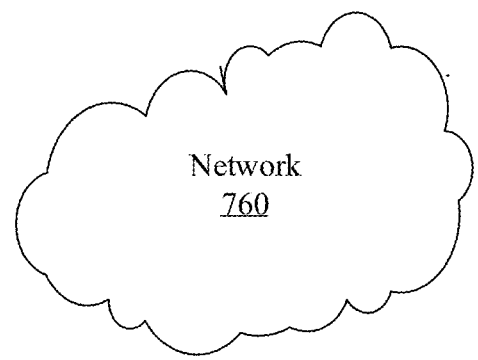
FIG. 14

SURFACE RECONSTRUCTION FOR INTERACTIVE AUGMENTED REALITY

TECHNICAL FIELD

Embodiments generally relate to graphics systems. More particularly, embodiments relate to surface reconstruction for interactive augmented reality.

BACKGROUND

Augmented reality (AR) may refer to a view or display of an apparent real-world environment where the objects that reside in the real-world view may be augmented by computer-generated perceptual information. The augmented information may be additive to the real-world view or mask aspects of the real-world view. For better user experiences, the augmented information should appear seamlessly interwoven with the real-world view such that it is perceived as an immersive aspect of the real environment.

BRIEF DESCRIPTION OF THE DRAWINGS

The various advantages of the embodiments will become apparent to one skilled in the art by reading the following specification and appended claims, and by referencing the following drawings, in which:

FIG. 9 is an illustrative equation to determine a bilateral smoothed 3D point according to an embodiment;

FIGS. 10A to 10C are illustrative perspective plots of examples of data utilized for bilateral kernel composition according to an embodiment;

FIG. 11 is an illustrative equation to determine an interpolated point according to an embodiment;

FIG. 14 is a block diagram of an example of a system having a navigation controller according to an embodiment.

DESCRIPTION OF EMBODIMENTS

Figure 1:
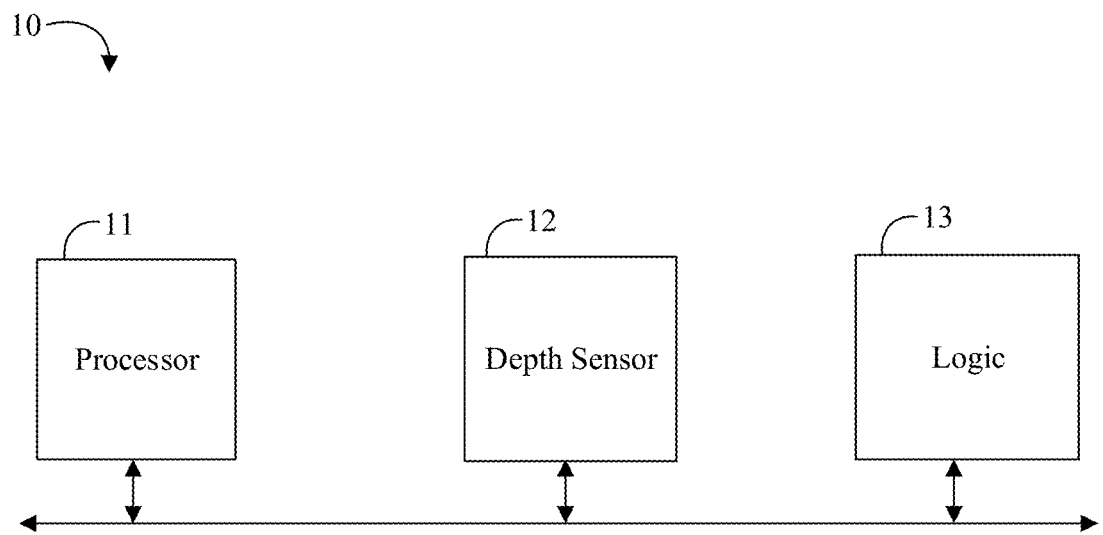
FIG. 1 is a block diagram of an example of an electronic processing system according to an embodiment.

Turning now to FIG. 1, an embodiment of an electronic processing system 10 may include a processor 11, a depth sensor 12 communicatively coupled to the processor 11, and logic 13 communicatively coupled to the processor 11 and the depth sensor 12 to perform depth sensor fusion to determine depth information for a surface, smooth the depth information for the surface and preserve edge information for the surface based on adaptive smoothing with self-tuning band-width estimation, iteratively remove holes from the surface based on conditional iterative manifold interpolation, reduce one or more of a file size and an on-memory storage size of data corresponding to the surface based on triangular edge contraction (e.g., or edge contraction for other graphic primitives), and construct at least a portion of a 3D model based on data corresponding to a visible portion of the surface. In some embodiments, the logic 13 may be further configured to acquire depth signals corresponding to the surface, and distill reduced noise depth signals based on temporal probabilistic analysis of the acquired depth signals (e.g., as part of the depth sensor fusion). In some embodiments, the logic may be further configured to determine global and local smooth-related strength and scope to adapt image metrics and depth range based on multivariate statistical kernel convolution (e.g., as part of the smoothing). In some embodiments, the conditional iterative manifold interpolation is based on a distance transformation and a heuristic-based graph traversal interpolation. In some embodiments, the triangular edge contraction is based on a perceptually-invariant complexity reduction (e.g., as part of the size reduction/optimization). For example, the logic 13 may also be configured to collapse edges based on an induced confidence cost factor derived from a fusion stability of each vertex in the surface. In some embodiments, the logic 13 may be located in, or co-located with, various components, including the processor 11 (e.g., on a same die).

Embodiments of each of the above processor 11, depth sensor 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the processor 11 may include a general purpose processor, a special purpose processor, a central processor unit (CPU), a graphics processor, a graphics processor unit (GPU), a controller, a micro-controller, etc.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, main memory, persistent storage media, or other system memory may store a set of instructions which when executed by the processor 11 cause the system 10 to implement one or more components, features, or aspects of the system 10 (e.g., the logic 13, performing depth sensor fusion, smoothing, interpolating, optimizing, creating the 3D model, etc.).

Figure 2:
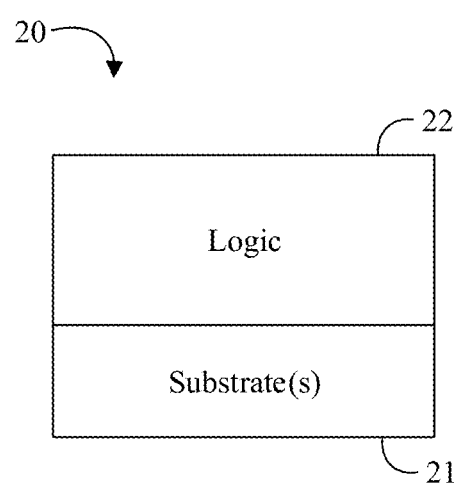
FIG. 2 is a block diagram of an example of a semiconductor package apparatus according to an embodiment.

Turning now to FIG. 2, an embodiment of a semiconductor package apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to perform depth sensor fusion to determine depth information for a surface, smooth the depth information for the surface and preserve edge information for the surface based on adaptive smoothing with self-tuning band-width estimation, iteratively remove holes from the surface based on conditional iterative manifold interpolation, reduce one or more of a file size and an on-memory storage size of data corresponding to the surface based on triangular edge contraction, and construct at least a portion of a 3D model based on data corresponding to a visible portion of the surface. In some embodiments, the logic 22 may be further configured to acquire depth signals corresponding to the surface, and distill reduced noise depth signals based on temporal probabilistic analysis of the acquired depth signals (e.g., as part of the depth sensor fusion). In some embodiments, the logic may be further configured to determine global and local smooth-related strength and scope to adapt image metrics and depth range based on multivariate statistical kernel convolution (e.g., as part of the smoothing). In some embodiments, the conditional iterative manifold interpolation is based on a distance transformation and a heuristic-based graph traversal interpolation. In some embodiments, the triangular edge contraction is based on a perceptually-invariant complexity reduction (e.g., as part of the size reduction/optimization). For example, the logic 22 may also be configured to collapse edges based on an induced confidence cost factor derived from a fusion stability of each vertex in the surface. In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of the method 25 (FIGS. 3A to 3C), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
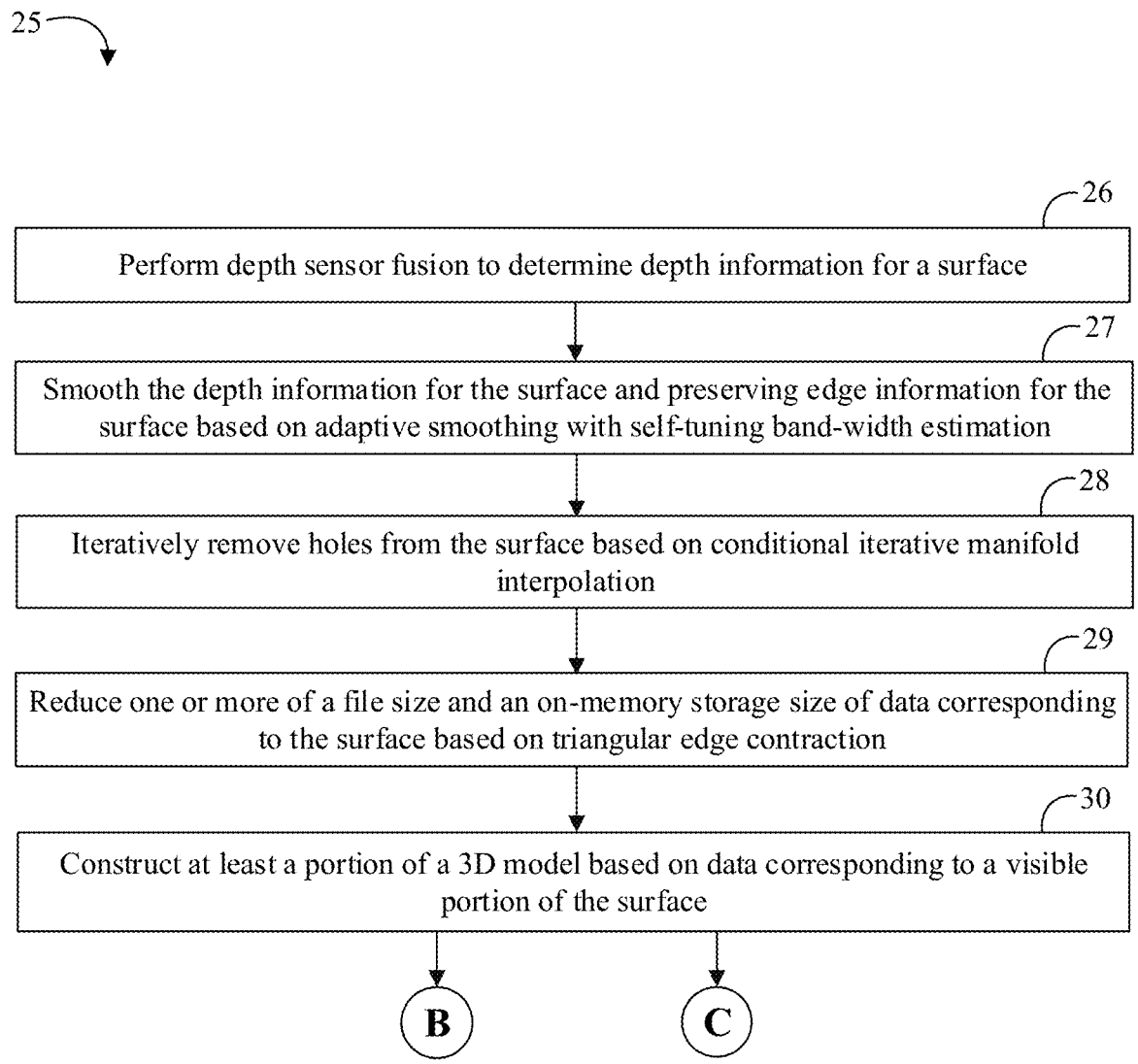
FIGS. 3A to 3C are flowcharts of an example of a method of constructing a 3D model of a real object according to an embodiment.
Figure 3B:
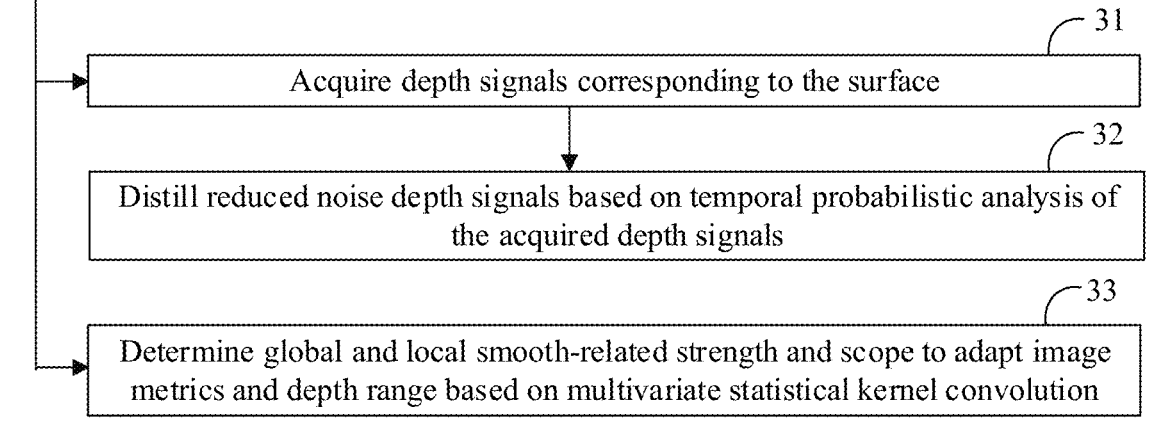
Figure 3C:
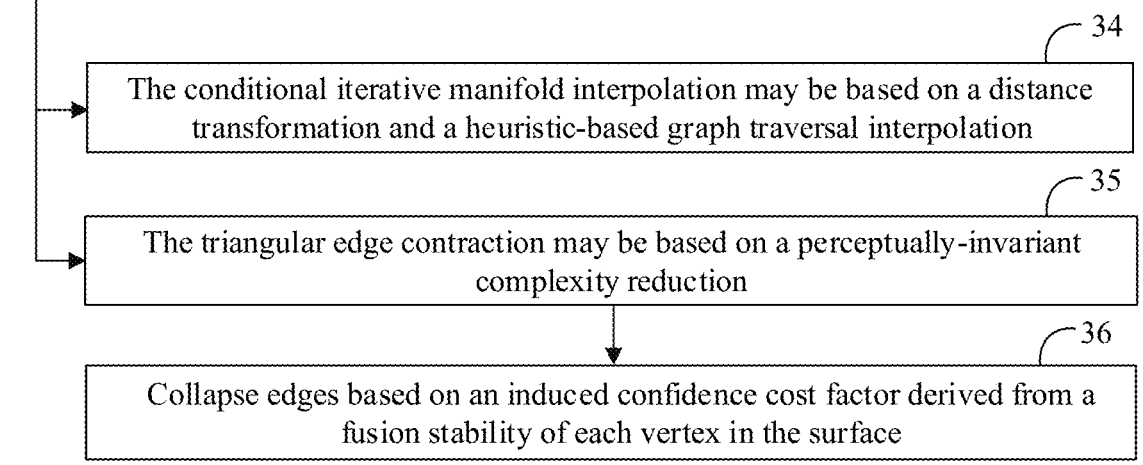

Turning now to FIGS. 3A to 3C, an embodiment of a method 25 of constructing a 3D model of a real object may include performing depth sensor fusion to determine depth information for a surface at block 26, smoothing the depth information for the surface and preserving edge information for the surface based on adaptive smoothing with self-tuning band-width estimation at block 27, iteratively removing holes from the surface based on conditional iterative manifold interpolation at block 28, reducing one or more of a file size and an on-memory storage size of data corresponding to the surface based on triangular edge contraction at block 29, and constructing at least a portion of a 3D model based on data corresponding to a visible portion of the surface at block 30. Some embodiments of the method 25 may further include acquiring depth signals corresponding to the surface at block 31, and distilling reduced noise depth signals based on temporal probabilistic analysis of the acquired depth signals at block 32 (e.g., as part of a fusion operation). Some embodiments of the method 25 may further include determining global and local smooth-related strength and scope to adapt image metrics and depth range based on multivariate statistical kernel convolution at block 33 (e.g., as part of a smoothing operation). In some embodiments of the method 25, the conditional iterative manifold interpolation may be based on a distance transformation and a heuristic-based graph traversal interpolation at block 34 (e.g., as part of an interpolation operation). In some embodiments of the method 25, the triangular edge contraction may be based on a perceptually-invariant complexity reduction at block 35 (e.g., as part of an optimization operation). For example, the method 25 may also include collapsing edges based on an induced confidence cost factor derived from a fusion stability of each vertex in the surface at block 36 (e.g., as part of the optimization operation).

Embodiments of the method 25 may be implemented in a system, apparatus, computer, device, etc., for example, such as those described herein. More particularly, hardware implementations of the method 25 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 25 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 25 may be implemented on a computer readable medium as described in connection with Examples 20 to 25 below. Embodiments or portions of the method 25 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide holeless and fold-less surface reconstruction for interactive augmented reality (AR). AR may be related to or synonymous with mixed reality and computer-mediated reality. Interactive human computer interfaces (HCl) based on image composition (e.g., head mounted displays for AR, etc.) or projection (e.g., 4D video, immersive gaming, educational or ludic virtual reality (VR), etc.) eventually enriched with physical interaction may require or benefit from smooth, highly representative hole-free and fold-free surface models, which may be referred to as bounded discrete manifolds.

Such 3D surface models may provide a direct or indirect geometric transformation between image content and world coordinates. Combining suitable 3D surface models with HCl-centric imagery into a new geometrically modified version of the original images renders the modified images ready to be integrated (e.g., composed or projected) in the real world for a seamlessly mixing into the scene.

Such a task-driven "distortion of 2D images" (sometimes referred to as spatial wrapping) may be beneficial or essential for overlaying a composition or a projection onto physical media. Rich wrapped visual contents may be synthesized in such a way that the overall products are vivid 3D objects with sharp appearance thru (and highly depend on) coherent spatial content consistent via reliable point-to-image and point-to-space relationships on the target surface and consequently environments.

Figure 4:
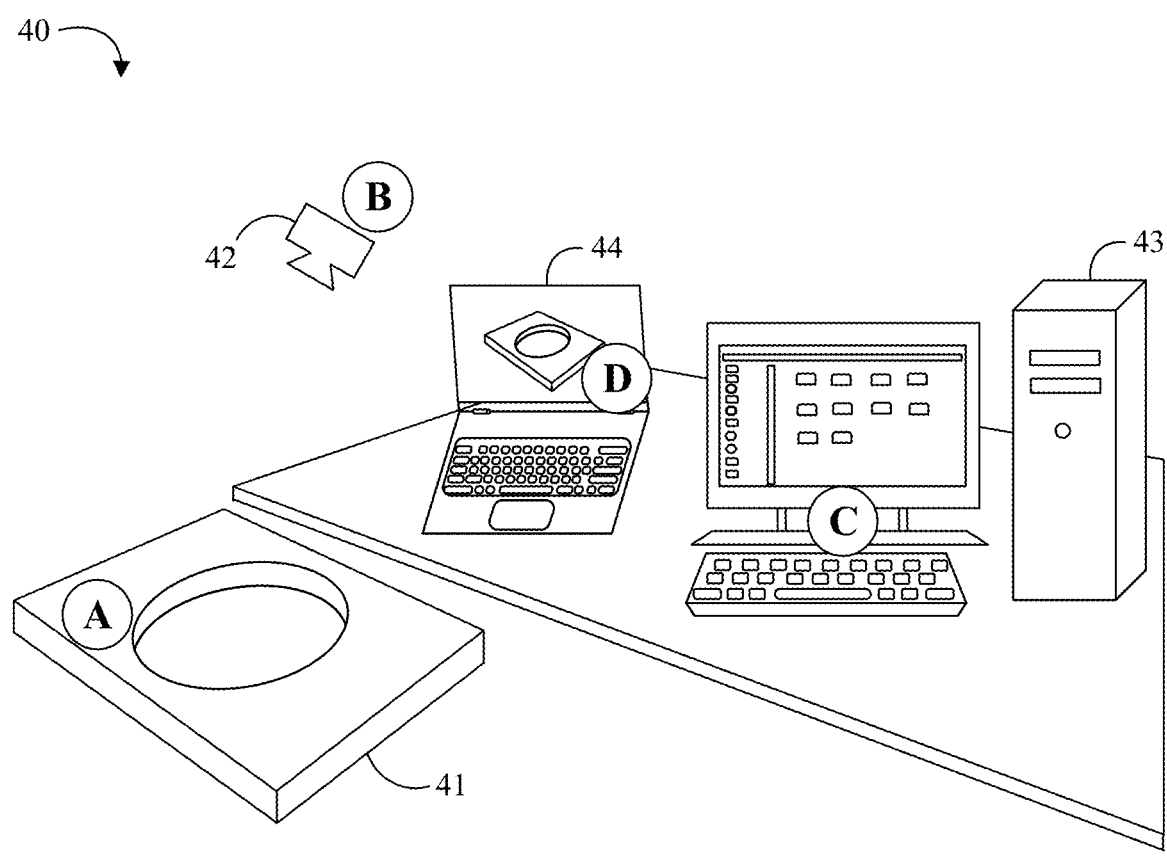
FIG. 4 is a perspective view of another example of electronic processing system according to an embodiment.

Turning now to FIG. 4, an embodiment of an electronic processing system 40 may include example technology for 3D surface reconstruction for use cases such as a HCl. A target object 41 may be utilized as an example 3D canvas. The system 40 may provide a free-form tangible monitor for a graphic user interface (GUI) intended for dual usage such as visualization and interaction. The computational representation of such a surface 3D mesh may need to fulfill challenging criteria while also being generated through readily available off-of-the-shelf inexpensive sensors 42 (e.g., a single red-green-blue-depth (RGB-D) camera). An example process flow may include (A) the target object 41 to be modeled using the depth sensor 42 at (B) placed at a suitable distance (e.g., to be able to capture enough space for an application with a single camera) that may be even slightly (e.g., about 14~18%) beyond the specification limits of the device. At (C), embodiments of technology described herein may simultaneously resolve one or more complex problems of the 3D surface reconstruction process (e.g., on a computing device 43). At (D), some embodiments may further include efficient serialization and visualization mesh tools (e.g., on a portable computer 44).

Given: i) a set of n-depth scans (e.g., a suitable estimation of n may be automatic as described in further detail below) from a particular vantage point captured through a sensor including but not limited to a RGB-D camera (e.g., such as INTEL's REALSENSE technology) and ii) a target display/interaction object (or scene sub-space) which is planned to be used for 3D activities via image composition or projection, a challenging problem is to automatically obtain 3D surface-mesh models without anomalies such as holes or folds, while producing surfaces that are smoothed edge-preserving, exposing regular distributions of vertices and polygons suitably depicting objects with high precision and remarkable representativeness stored in compact files. Some embodiments may advantageously solve one or more of the foregoing problems.

Some embodiments may generate a 3D surface model which exceeds the required criteria for many HCIs or other similar interactivity use cases. An important reconstruction criterion in many applications may include a sound, bounded manifold structure (e.g., a fold-free and hole-free mesh with smooth transitions preserving abrupt edges of the physical object). As compared to a CAD wire-frame model corresponding to the target object 41, some embodiments may generate a sound, bounded manifold structure as represented by a generated 3D surface model with low measured deviation from the CAD model ground truth (e.g., less than 1 mm over a substantial portion, between 1 and 3 mm in some areas, and more than 3 mm in few areas).

Some other systems may provide technology to generate 3D surface models from depth cameras. However, these other systems may suffer from one or more problems. For example, some other systems may not reliably manage more than one critical constraint at a time. For example, some other systems may deal with the signal noise but produce low acutance, namely blurring surface edges. Some other systems may have very accurate edges but limit the target distance or impose size limits significantly reducing the usable space. Some other systems may be strongly limited to a restrictive sensing range segment of the device because they do not provide technology to fully exploit or to expand the sensing range where 3D points present high stochastic behavior. Another common limitation to some other systems is that their end-to-end process takes a long period (e.g., even minutes) and/or may also require human intervention in a trial-tune-adjust loop.

Some embodiments may overcome various reconstruction problems by providing probabilistic fusion and depth resolution optimization technology. Some embodiments may advantageously manage the sensor noise beyond the specified maximal sensing depth, providing a beneficial sensing range expansion. Some embodiments may provide substantially fully automatic (e.g., pressing one-single-button, an application call, etc.) and parameter-free (e.g., no settings to adjust or change independently of the camera pose or object type) technology, empowering robust application and simple deployment with consistently tough behavior even in the presence of complex materials with real-world unpropitious lighting conditions. Some embodiments may generate high quality surfaces with edge acutance and accuracy, which may be beneficial when overlaying images or when projecting sharp lines on shrill or rim surfaces. For example, some embodiments may evade creating folds and consequently occlusions creation while also emphasizing oriented boundaries or rim zones to project distinctive 3D features with line or boundary attributes for superior graphical perceptual interfaces. Some embodiments may also advantageously complete the process quickly (e.g., on the order of a few seconds).

Figure 5:
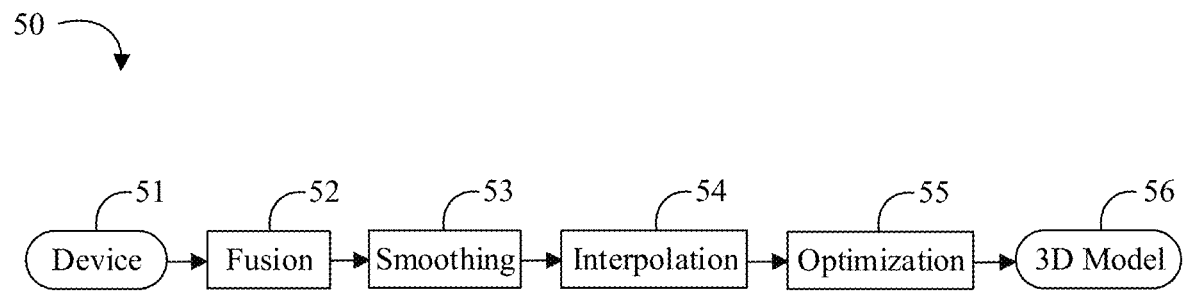
FIG. 5 is a flowchart of an example of a process flow for surface reconstruction according to an embodiment.

Turning now to FIG. 5, an embodiment of a process flow 50 for surface reconstruction may include suitable hardware and software to provide a dual domain (e.g., imaging signal and geometry) processing pipe-line which may be conceptually divided in about four or more phases. Inputs provided by a device 51 may be processed by the pipe-line including a fusion phase 52, a smoothing phase 53, an interpolation phase 54, and an optimization phase 55. The results of the processing pipe-line may include a generated 3D model 56. The fusion phase 52 may include depth sensing fusion technology for signal acquisition and temporal probabilistic optimization of the acquired signals which may enable the distillation of noise-free depth signals from noisy collections of scans (e.g., swiftly captured RGB-D images). The smoothing phase 53 may include technology to perform an adaptive band-width estimation for edge preserving depth smoothing (e.g., to determine the global and local smoothing strength and scope adapting the image metrics and Z-depth range using multivariate Gaussian kernel convolution). The interpolation phase 54 may include technology to perform iterative hole-removal through projected growing manifold interpolation via kernel blending (e.g., a well-designed interpolation exploiting the partial manifold structure may include exploiting distance transformations and a heuristic-based graph traversal interpolation). The optimization phase 55 may include technology to perform surface mesh optimization for perceptual invariant complexity reduction. For example, edge-collapsing techniques for mesh reduction may be extended by incorporating an induced confidence cost factor derived from the fusion stability of each vertex.

Embodiments of aspects of the process flow 50 may include software developer kits (SDKs) suitable for use with a variety of depth sensors, including, for example, multiple kinds of RGB-D cameras, LIDAR sensors, RADAR sensors, ultrasonic sensors, coherent electromagnetic range sensing technology, etc. Advantageously, such SDKs may enable features sets which include one or more of: extra/extended depth range modeling, even beyond comparable camera, LIDAR, RADAR specifications; hole-free and fold-free modeling with automatic target detection; efficient 3D digitalization with compact representation resilient to specular spots on shinning objects as well as heavily rugged or textured materials; and parameter-less end-to-end system for automatic one-shot efficient 3D modeling.

Some embodiments may advantageously provide end-to-end hole-less and fold-less surface reconstruction. Some embodiments may physically or logically decompose the reconstruction process in about four or more self-contained phases (e.g., according to the signal type), which may include probabilistic fusion for signal acquisition (e.g., corresponding to the fusion phase 52), statistical estimation of band-width for bilateral surface smoothing (e.g., corresponding to the smoothing phase 53), conditional iterative manifold interpolation based on distance transformation on projected depth (e.g., corresponding to the interpolation phase 54), and surface optimization using edge contraction with vertex stability and curvature cost functions to preserve perceptual shape (e.g., corresponding to the optimization phase 55).

Some embodiments may utilize data captured with depth cameras such as INTEL REALSENSE cameras. The amount of images captured during the sensing phase may vary (e.g., between 60~300 images). The amount of images may depend on distance between the object(s) and the camera. The further the distance between the objects, the more images that may be required. The number of images captures may be controlled in closed loop while estimating the smoothing bandwidth. For example, if the stability of the log-Gaussian fitting is not stable (e.g., as explained in more detail below), then 60 frames more may be captured until convergence or reaching the maximum of 300.

The acquisition/fusion of the depth signals may be the first part of the surface reconstruction pipeline. The initial data may have very limited dynamic range in the depth due to the outliers of the raw signal. After removing outliers located beyond twice as much the maximal depth specification of the camera (specs) the dynamic depth of the scene may be significantly improved/observable. The smoothed depth image may still include observable, undesirable depth artifacts, namely holes in some regions of the surface. Some embodiments may segment each of the surface patches as connected components of points in the scene which may be observed as bounding boxes. After processing the surface through an embodiment of the surface reconstruction pipeline, the absence of holes or folds may be observed, while edges are preserved and the depth is significantly smoother. Some embodiments of the surface reconstruction pipeline may include (1) probabilistic temporal fusion (e.g., noise removal-probabilistic distribution function (PDF) per pixel by kernel density estimation (KDE); significantly expands camera range); (2) automatic target recognition (e.g., detects object from environment; robust for deployment in real world); (3) holes and artifacts processing (e.g., margin expansion for stable surfaces; precise growing-manifold interpolation); (4) edge preserving smoothing (e.g., projectable surface mesh generation; dense and coherent surface with normal).

Fusion Phase Examples

Examples of probabilistic fusion for signal acquisition may include technology to go from noisy signals to optimal depth quasi-manifolds (e.g., as part of the fusion phase 52 from FIG. 5). The depth image provided by a sensing device (such as RGB-D cameras) may be expressed as follows:

$$I_t(x \in \Omega) \rightarrow \{\gamma := [0, \ldots, (2^m - 1)] \subset Z\} \qquad [\text{Eq. 1}]$$

This is a non-stationary, surjective, function mapping two sets, from the image coordinate set $\Omega$ expressed as follows:

$$\Omega := \{(i,j) | 0 \leq i < W, 0 \leq j \leq H\} \qquad [\text{Eq. 2}]$$

(for images of W pixels wide and H pixels height) to the discrete quantized depth set $\gamma$ consisting of distance values representable with m bits. This depth image $I_t$ is temporally registered by its index timestamp $t \in Z^+$, (e.g., see FIG. 6).

Figure 6:
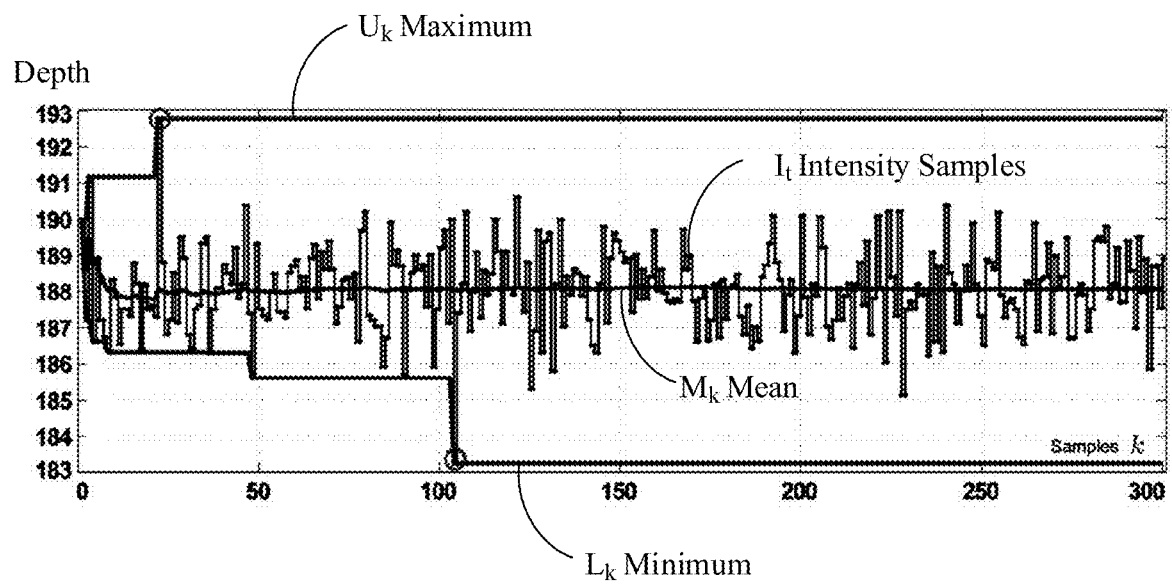
FIG. 6 is an illustrative graph of an example of depth versus samples according to an embodiment.

Turning now to FIG. 6, an embodiment of a graph of depth versus samples illustrates the depth noise behavior for a single pixel within a temporal scope of 300 frames captured at 60 Fps. The descriptive statistics are displayed to show various important aspects of the mean and boundaries changes described below in connection with FIG. 7. Due to several (multifaceted & correlated) factors of scene and the depth capturing devices, the depth images are permanently contaminated with complex (non-Gaussian) time-varying noise. This means, two sequential images captured from the same vantage point within exactly the same scene conditions will expose deviations in their digitalized depth. However, because the camera and scene are placed statically while capturing images model creation, in a rather short period (e.g., a few seconds, or approximately 1 to 5 seconds depending on the task and setup), it is possible to formulate this acquisition as an inferring sensing process, or a per-element stochastic optimization problem.

In these terms, the task is to obtain the optima values $I'_{[t_0, t_1]}(x)$ which represent the depth measurable at pixel x (e.g., closest discrete and quantized "real" depth). In other words, this per-pixel function modeling is the result of the estimation of the most probable depth value for each pixel location x considering the time sampling scope contained between $t_0$ and $t_1$ (e.g., see FIG. 6). In some embodiments, this task may be solved by using three key mathematical bases. First, a histogram of depth values is created to produce a discrete approximation of the PD-PDF (Pixel Depth—Probabilistic Distribution Function), namely:

$$H(x):=\{(d,f)|d\in\gamma, f\in[0,\in t_1-t_0|]\} \qquad [\text{Eq. 3}]$$

Such a histogram contains bins which express the amount of occurrences ($f \in Z$ stands for counting frequency) at each discrete depth $d \in Z$ usually in millimeters. Notice frequency values are bounded somewhere between 0 and the length of the sampling period $|t_1-t_0|$, which may be about 60~300 frames.

Second, finding the bin-mode with the maximal associated frequency ($d'$, $f_{max}$) assesses the first and raw approximation to the optimal depth. However, because the bin accuracy is only up to the discretization factor of H, this still needs to be improved to reflect real world surfaces. The advantage of this first stage is that such procedure is invariant to any type and amount of outliers. The process is extremely efficient in execution time, due to the simultaneous insertion of samples and tracking of the bin-mode(s). But this computational advantage possibly comes with a drawback of a large memory footprint if implemented straightforwardly. Some embodiments may overcome this memory size problem using a linked list for H' instead of a full fledge histogram H. This helps to reduce the memory footprint between 2 to 3 orders of magnitude. This is completed while simultaneously keeping track of the maximal frequency bin(s) during each insertion enabling both high performance and minimal memory footprint. Some embodiments may run the full process in the so-called inter-frame period (the time between capturing two images from the device, e.g. <<16 msec.) making it unnoticeable or temporal transparent to the next stages along the pipeline.

Finally, by estimating the continuous optimal depth using a local continuous PDF estimation via KDE, it is possible to i) disambiguate multiple equally salient bin-modes, in other words remove folds in the surface, and ii) significantly improve the resolution of the depth sensor to an ideal noise-less continuous depth measurement device. This may be expressed as:

$$\beta_{KDE}(H(x),(d',f_{max})) \rightarrow d_{opt} \in R^+ \qquad [\text{Eq. 4}]$$

The implemented module for density optimization using gradient ascent sampling from kernel density estimation ($\beta_{KDE}$) automatically determines its mixing radius (also-called bandwidth or Parzen-window size) using the Silverman's rule on Epanechnikov kernel during the density accumulation.

Figure 7:
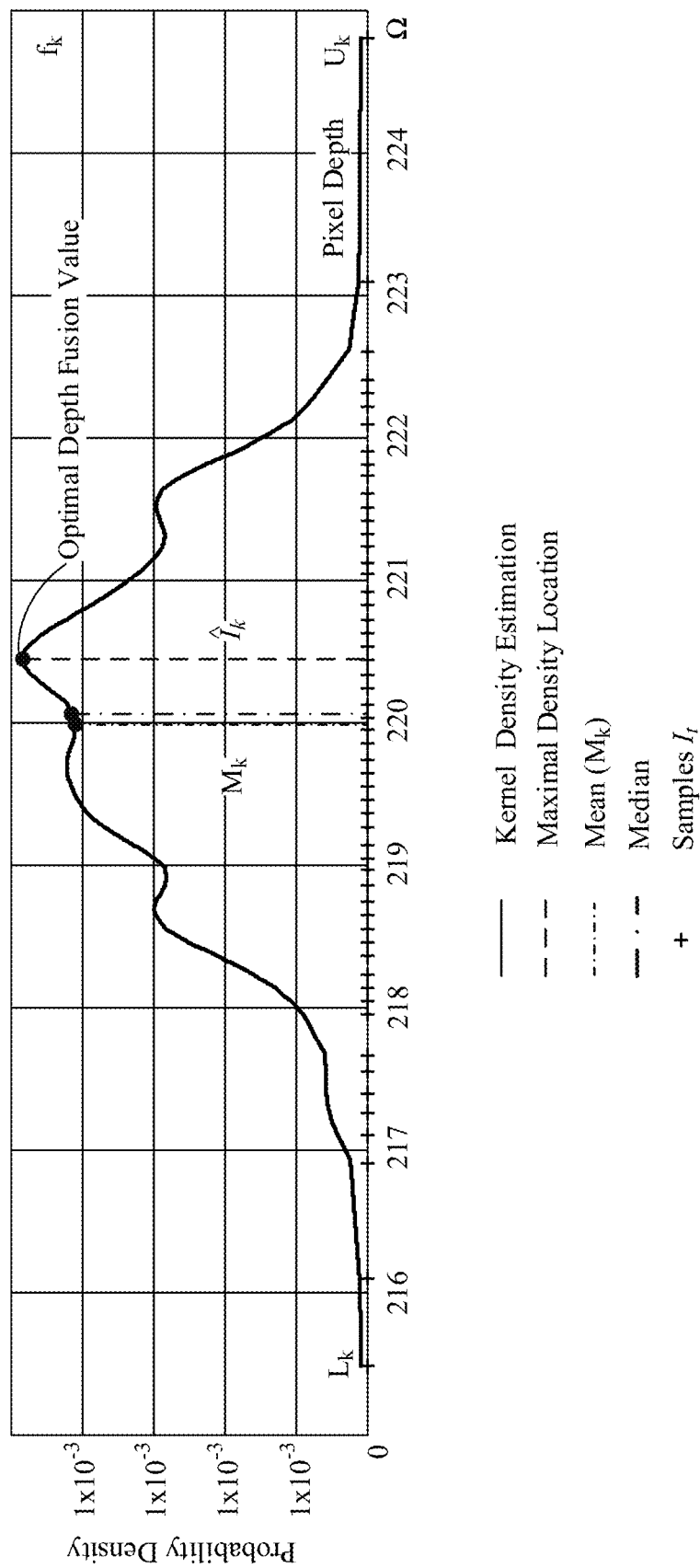
FIG. 7 is an illustrative graph of an example of probability density versus pixel depth according to an embodiment.

Turning now to FIG. 7, an embodiment of a graph of pixel depth versus probability density illustrates depth fusion using the histogram's bin-modes detection and iterative KDE gradient ascent. Density-based optimization exposes robustness to outliers while improving the depth signals in terms of resolution, namely from unstable noisy discretized depth to stable, precise, continuous noiseless signal. As seen in FIG. 7, the mean and median values are far from best fusion strategies. Without being limited to theory of operation, this may happen due to pull and drown effects these values suffer from the unavoidable contributions of outlier samples. This is essentially why the histogram and KDE gradient ascent method obtain accurate and robust depth estimations.

At this point in the pipe-line, the temporal depth fusion technique has integrated a collection of n depth images (usually n 60~300 images captured at 60 FPS) into a single noise-less, stable and resolution improved depth image which not only rejected outliers or complex noise patterns but does it in a parameter-free (for the program or user) and assumption-less (about the noise or scene structure) manner. Note that KDE used for gradient ascent over the PDF improves the depth estimation from a discrete value (usually in integer mm) to a real value. This significantly helps to represent subtle transitions of the surfaces particularly when having inclined planes or subtle curvature surfaces. Finally, memory and computation efficiency may be managed with a sagacious combination of a generalized density management methods coupled with purpose specific data structures.

Smoothing Phase Examples

Some embodiments may advantageously include technology to provide a statistical estimation of band-width for bilateral surface smoothing (e.g., as part of the smoothing phase 53 from FIG. 5). After the surface has been depth optimized, it is still affected by holes due to the surface materials or camera's uneven response functions. Therefore, it is beneficial to smooth the surface considering the following: (1) Holes on the surface are not only a problem of missing points, they also corrupt the regions around at their borders. Thus, smoothing the surface edge-points (close or directly around the holes or boundaries of the surface) should not equally contribute during the weighted aggregation; (2) The distance from one point on the surface to its neighbors should be weighted by kernels during smoothing in a non-straightforward and very careful manner. This means, the distance computation shall not be considered Euclidean point-to-point, but instead it should be computed as (Hausdorff) minimal distance over the surface. This slightly weighting difference makes the smoothing results remarkably different within regions containing holes, boundaries or large slops; and (3) The spatial band-width selection for smoothing needs to be both globally invariant and optimal (see FIG. 8), while the local range band-width ought to adapt the confined nature of each patch. This is a natural aftermath of multilateral filtering. Advantageously, some embodiments provide technology to frame a systematic approach to estimate both of these band widths.

Figure 8:
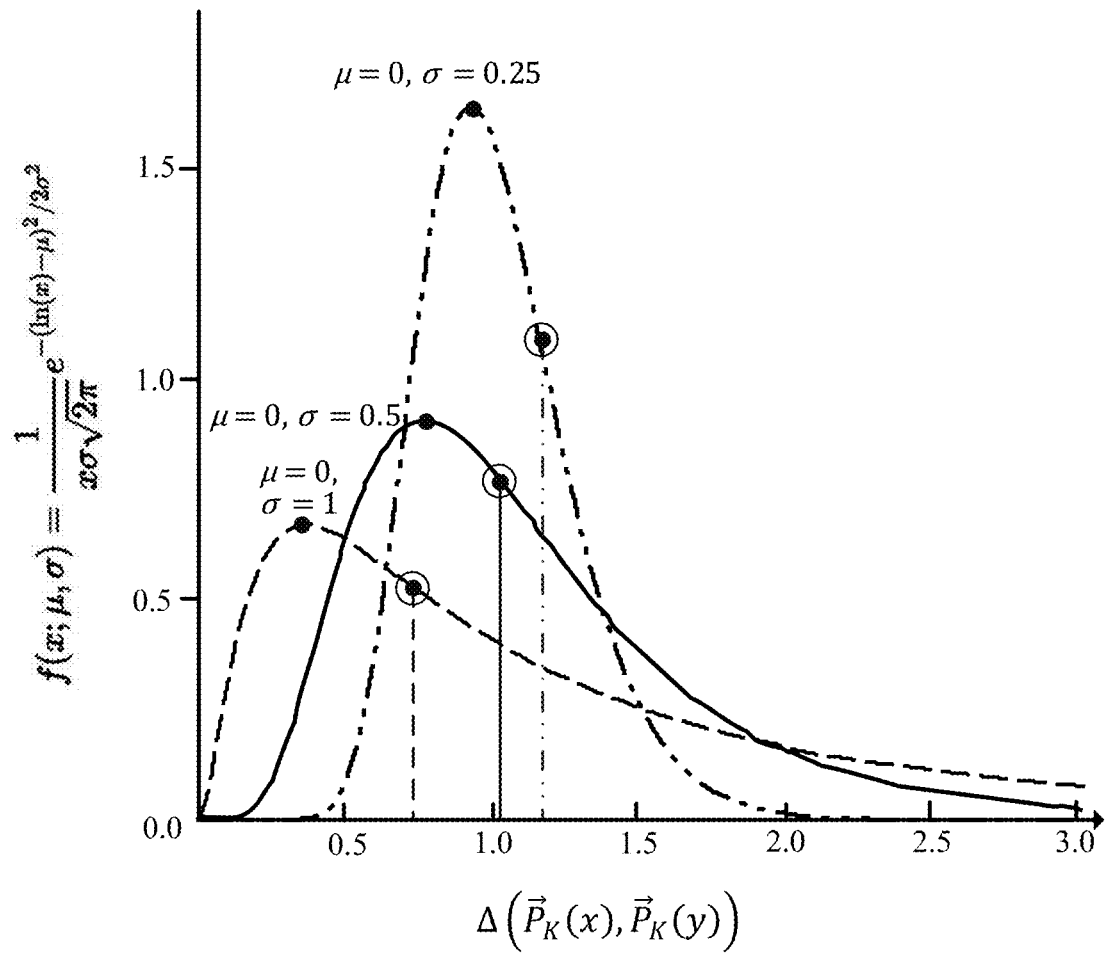
FIG. 8 is an illustrative graph of an example of surface distance distribution according to an embodiment.

FIG. 8 shows an embodiment of a graph of surface distance distribution using a Hausdorff metric. Notice three different surfaces are fitted to the Log-Normal distribution. The importance of fitting this parametric distribution relies on the fact that it allows to draw the band width directly from the distribution descriptors, namely mean and standard deviation. This is denoted by the dots at the mean $\mu$ and $\mu+\sigma$, marked with dotted lines. In summary, the distance value at the $3^{rd}$ quantile ($\mu+\sigma$) is obtained by fitting the log-normal distribution $\Delta$. This automatically and invariantly determines the global spatial band-width for smoothing of each surface at running time.

Based on these criteria, the formal expressions describing the spatial band-width assertion are as follows. First, the pixel depth $\Gamma'_{[t_0,t_1]}(x)$ resulting from previous stage implies a spatial point $\vec{P}_K(x)$ is uniquely determined by i) the image coordinates $x \subset Z^2$, ii) its depth $\Gamma'_{[t_0,t_1]}(x)$, and iii) the camera projective matrix $K \in R^{3,3}$ obtained by previous (automatically done device and accessible via API or well man-made) accessible calibration, namely:

$$\vec{P}_K(x):=\Lambda(x,\Gamma'_{[t_0,t_1]}(x),K) \in R^3 \qquad [\text{Eq. 5}]$$

The distance over the surface is a determined by the trajectory with minimal length connecting two associated points x and y as $$\Delta(\vec{P}_K(x),\vec{P}_K(y)):=_{arg\ min}|[\vec{P}_K(x), \ldots, \vec{P}_K(y)]| \qquad [\text{Eq. 6}]$$

This heavy computation is efficiently implemented using a distance transformation of $I'_{[t_0,t_1]}$ over an undirected graph where the sources (at 0 distance points) are the borders and holes contours of the depth image. The sink regions are at the medial axis of the surface. By limiting the topological graph distance $1 \leq g \leq r \in Z^+$, the Hausdorff distance distribution over $\Delta$ (distance pairs) provides an invariant insight of the structure of the surface. This is actually invariant when observing it in terms of the underlying curve distribution, namely a log-Gaussian shape (e.g., see FIG. 8). The distance $\mu+\sigma$ is determined empirically and selected as global smoothing band-width.

Turning now to FIG. 9, an embodiment of an equation based on the foregoing definitions may be utilized to determine the bilateral smoothed 3D point $\vec{P}'_K(X)$. The set $U_{\mu+\sigma}(x)$ consists of all the points within the neighborhood of x at a maximal distance $\mu+\sigma$. Likewise, the blending kernel function $K_{\mu+\sigma}$ is the 3D spatial Gaussian weighting, whereas the T blending kernel is the depth only $I'_{[t_0,t_1]}$ Gaussian weighting function. The simultaneous range and space weighting kernels enable the edge preserving (e.g., see FIGS. 10A to 10C).

FIGS. 10A to 10C show an embodiment of bilateral kernel composition. FIG. 10A shows an example input signal. FIG. 10B shows an adaptive bilateral kernel ($K_{\mu+\sigma} * T$). FIG. 10C shows an edge preserving smoothed output in accordance with some embodiments.

Interpolation Phase Examples

Some embodiments may advantageously include technology to provide conditional iterative manifold interpolation (e.g., as part of the interpolation phase 54 from FIG. 5). At this phase of the pipeline, the surface was created from a fold-less fused depth surface. Then subtle deviations were removed by the bilateral smoothing. Now, the holes should be filled estimating the most suitable transitions between their edge zones. Therefore, an iterative stitching-like technique may connect points as follows:

$$\vec{P}'_K(x) \rightarrow \vec{P}'_K(x \pm \omega \in \Omega_1 := \{(0,1),(1,1),(1,0), (-1,1),(-1,0),(-1,-1),(0,-1),(1,-1)\}) \quad [Eq. 7]$$

(in this context called vertices) in such a way that the hole becomes completely filled where opposite vertices meet in a new interpolated mesh in a continuous and consistent manner. For this to occur, the following aspects need to be formally modeled using the mesh-graph structure and (previously defined) kernel blending combinations when creating new filling vertices points: (1) Continuous interpolation is solving solely the Z depth value per pixel. This occurs because in the 3D point is estimate by $\Lambda(x, I'(x), K)$. This means, the problem of estimating the $\vec{P}'_K(x) \rightarrow (X, Y \text{ and } Z)$ spatial coordinates is reduced to obtain $I'(x)$ from x's connected neighborhood $\Omega_i$; (2) Because not all the elements in the neighborhood (of a mesh vertex close to a hole) exist and those which exist are distributed at different surface distances (in term of Hausdorff metric), the interpolation process is an iterative sequence of depth estimations moving from the borders of hole to its center. Moreover, because the quality and consistency of points close to the hole are not reliable, the neighborhood set $\Omega_i$ has a minimal graph radius $i \geq 3 \in Z$.

Turning now to FIG. 11, an embodiment of an equation may be utilized to determine the interpolated point $\vec{P}''_K(x)$. The selective interpolation is expressed using previously defined blending kernels $K_\omega$ within the support $\Omega_i$. The two new elements in the formulation are the order of execution $U_\omega^\dagger(x)$ (a priority list) and the selection of contribution $Q(y) \rightarrow \{0,1\}$ for those elements (outside and already inside) on the surface.

Figure 12A:
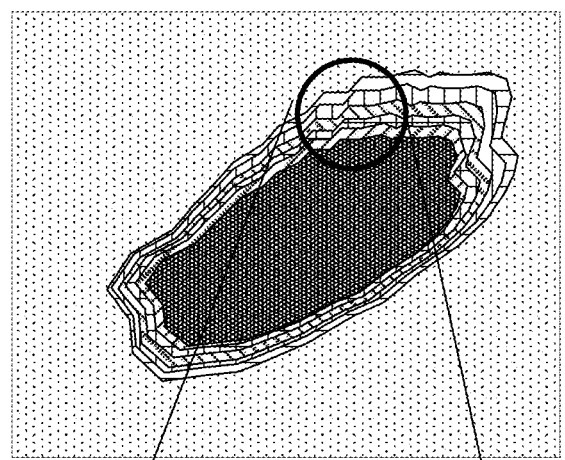
FIGS. 12A to 12E are illustrative diagrams of examples of a process flow for conditional iterative interpolation according to an embodiment.
Figure 12B:
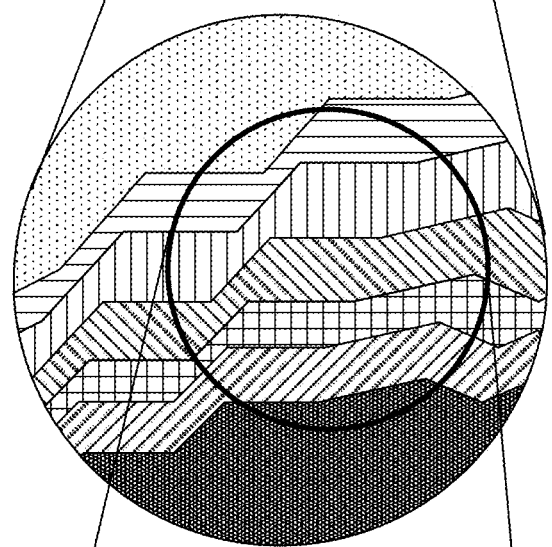
Figure 12C:
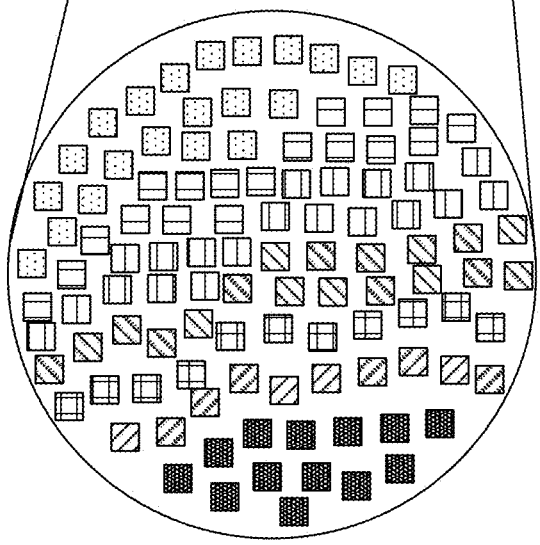
Figure 12D:
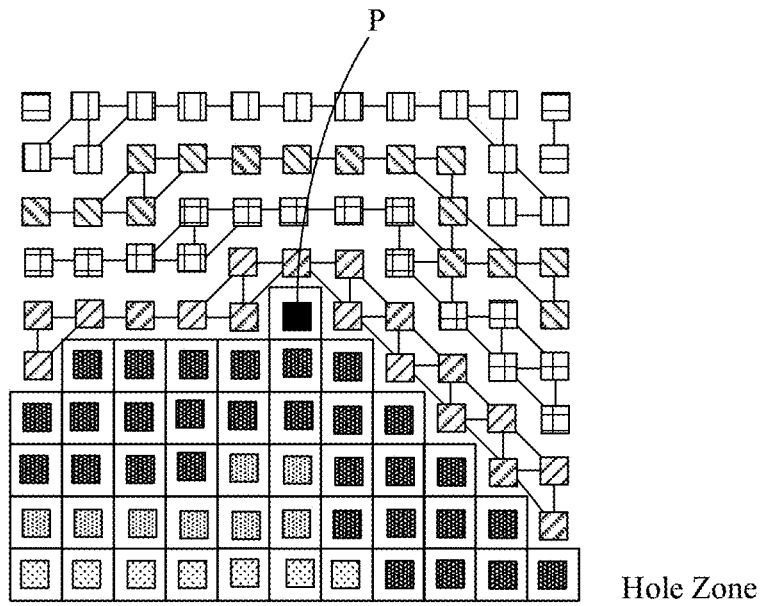
Figure 12E:
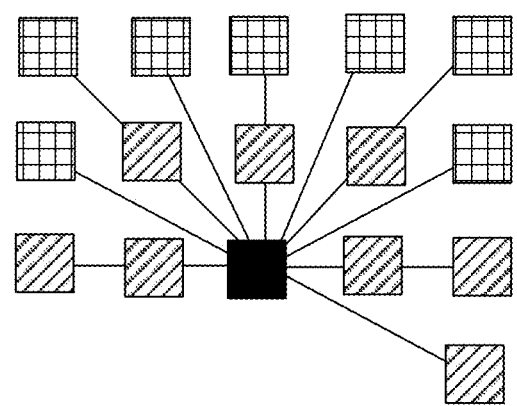

FIGS. 12A to 12E show an embodiment of a process flow for conditional iterative interpolation. FIG. 12A shows a hole on the surface represented with different fill patterns for the distance transformation. In this diagram, each different fill pattern represents topological steps or different graph distances from the edge of the hole. FIG. 12B shows an illustrative zoom into the hole border and enable extraction of a second level zoom shown in FIG. 12C (e.g., with representative pixels). The vertex order in FIG. 12C corresponds to the perspective modified version of FIG. 12D. Notice the point P located in the center of FIG. 12D. This point P is the first vertex to be interpolated using the support area (the neighborhood) as illustrated by links in FIG. 12E. These links are weighted based on both i) graph distance and ii) Hausdorff distance over the manifold. The order of interpolation and the links of the subsequent vertices is efficiently updated via a priority list. The resulting interpolation sequence is similar to the motion of a spider while creating a web.

Optimization Phase Examples

Some embodiments may advantageously include technology to provide surface optimization (e.g., as part of the optimization phase 55 of FIG. 5). Once the mesh is produced without folds, holes or other defects, the amount of triangles may still be inadequate or overwhelming for certain applications. This motivates a shape preserving mesh reduction. During this process the idea is to remove as many triangles as possible without significantly or noticeably altering the shape of the implicit surface. Those skilled in the art will appreciate that any suitable mesh technology may be applied in this phase. Technology sometimes referred to as edge reduction or contraction techniques may be most suitable. In particular, some other edge reduction technology may be improved by adding edge saliency (aperture or crease angle) and vertex confidence (which values are standard deviation values coming all the way from the depth fusion stage) to the sorting cost function driving the edge contractions (e.g., see FIG. 13). Advantageously, some embodiments of the extended edge reduction technique may help ensure the edge reduction occurs only in regions with lower sensing confidence (e.g., ensuring highly reliable behavior on filled interpolated zones).

Figure 13:
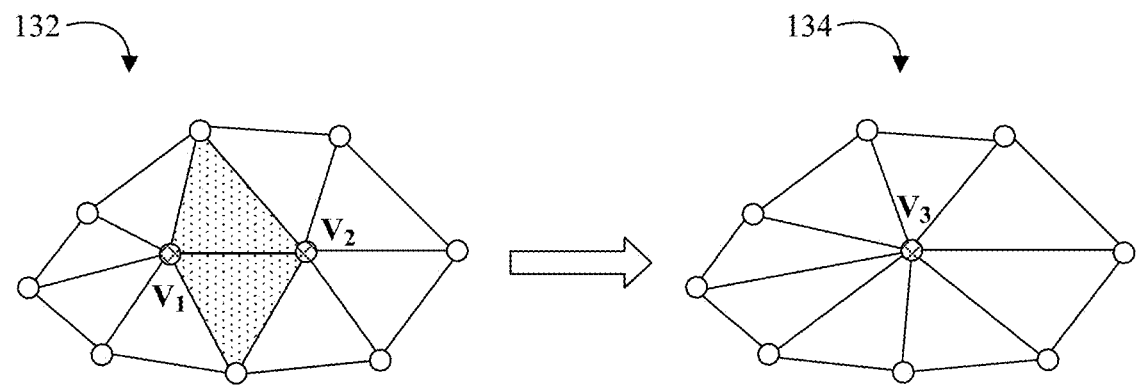
FIG. 13 is an illustrative diagram of an example of a mesh according to an embodiment.

Turning now to FIG. 13, an embodiment of a mesh 132 may include vertices $v_1$ and $v_2$. Following an optimization phase, the new mesh 134 may only include the one central vertex $v_3$. For example, the optimization phase may include edge contraction for mesh optimization. The selection of the edge may be based on a cost function relating crease angle and the stability of the vertices.

FIG. 14 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, the system 700 comprises a platform 702 coupled to a display 720 that presents visual content. The platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, the platform 702 may comprise any combination of a chipset 705, processor 710, memory 712, storage 714, graphics subsystem 715, applications 716 and/or radio 718 (e.g., network controller). The chipset 705 may provide intercommunication among the processor 710, memory 712, storage 714, graphics subsystem 715, applications 716 and/or radio 718. For example, the chipset 705 may include a storage adapter (not depicted) capable of providing intercommunication with the storage 714.

The processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 710 may comprise dual-core processor(s), dual-core mobile processor(s), and so forth.

The memory 712 may be implemented as a volatile memory device such as, but not limited to, a Random Access Memory (RAM), Dynamic Random Access Memory (DRAM), or Static RAM (SRAM).

The storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

The graphics subsystem 715 may perform processing of images such as still or video for display. The graphics subsystem 715 may be a graphics processing unit (GPU) or a visual processing unit (VPU), for example. An analog or digital interface may be used to communicatively couple the graphics subsystem 715 and display 720. For example, the interface may be any of a High-Definition Multimedia Interface (HDMI), DisplayPort, wireless HDMI, and/or wireless HD compliant techniques. The graphics subsystem 715 could be integrated into processor 710 or chipset 705. The graphics subsystem 715 could be a stand-alone card communicatively coupled to the chipset 705. In one example, the graphics subsystem 715 includes a noise reduction subsystem as described herein.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 718 may be a network controller including one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, the display 720 may comprise any television type monitor or display. The display 720 may comprise, for example, a computer display screen, touch screen display, video monitor, television-like device, and/or a television. The display 720 may be digital and/or analog. In embodiments, the display 720 may be a holographic display. Also, the display 720 may be a transparent surface that may receive a visual projection. Such projections may convey various forms of information, images, and/or objects. For example, such projections may be a visual overlay for a mobile augmented reality (MAR) application. Under the control of one or more software applications 716, the platform 702 may display user interface 722 on the display 720.

In embodiments, content services device(s) 730 may be hosted by any national, international and/or independent service and thus accessible to the platform 702 via the Internet, for example. The content services device(s) 730 may be coupled to the platform 702 and/or to the display 720. The platform 702 and/or content services device(s) 730 may be coupled to a network 760 to communicate (e.g., send and/or receive) media information to and from network 760. The content delivery device(s) 740 also may be coupled to the platform 702 and/or to the display 720.

In embodiments, the content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

The content services device(s) 730 receives content such as cable television programming including media information, digital information, and/or other content. Examples of content providers may include any cable or satellite television or radio or Internet content providers. The provided examples are not meant to limit embodiments.

In embodiments, the platform 702 may receive control signals from a navigation controller 750 having one or more navigation features. The navigation features of the controller 750 may be used to interact with the user interface 722, for example. In embodiments, the navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of the controller 750 may be echoed on a display (e.g., display 720) by movements of a pointer, cursor, focus ring, or other visual indicators displayed on the display. For example, under the control of software applications 716, the navigation features located on the navigation controller 750 may be mapped to virtual navigation features displayed on the user interface 722, for example. In embodiments, the controller 750 may not be a separate component but integrated into the platform 702 and/or the display 720. Embodiments, however, are not limited to the elements or in the context shown or described herein.

In embodiments, drivers (not shown) may comprise technology to enable users to instantly turn on and off the platform 702 like a television with the touch of a button after initial boot-up, when enabled, for example. Program logic may allow the platform 702 to stream content to media adaptors or other content services device(s) 730 or content delivery device(s) 740 when the platform is turned "off." In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in the system 700 may be integrated. For example, the platform 702 and the content services device(s) 730 may be integrated, or the platform 702 and the content delivery device(s) 740 may be integrated, or the platform 702, the content services device(s) 730, and the content delivery device(s) 740 may be integrated, for example. In various embodiments, the platform 702 and the display 720 may be an integrated unit. The display 720 and content service device(s) 730 may be integrated, or the display 720 and the content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 14.

Figure 15:
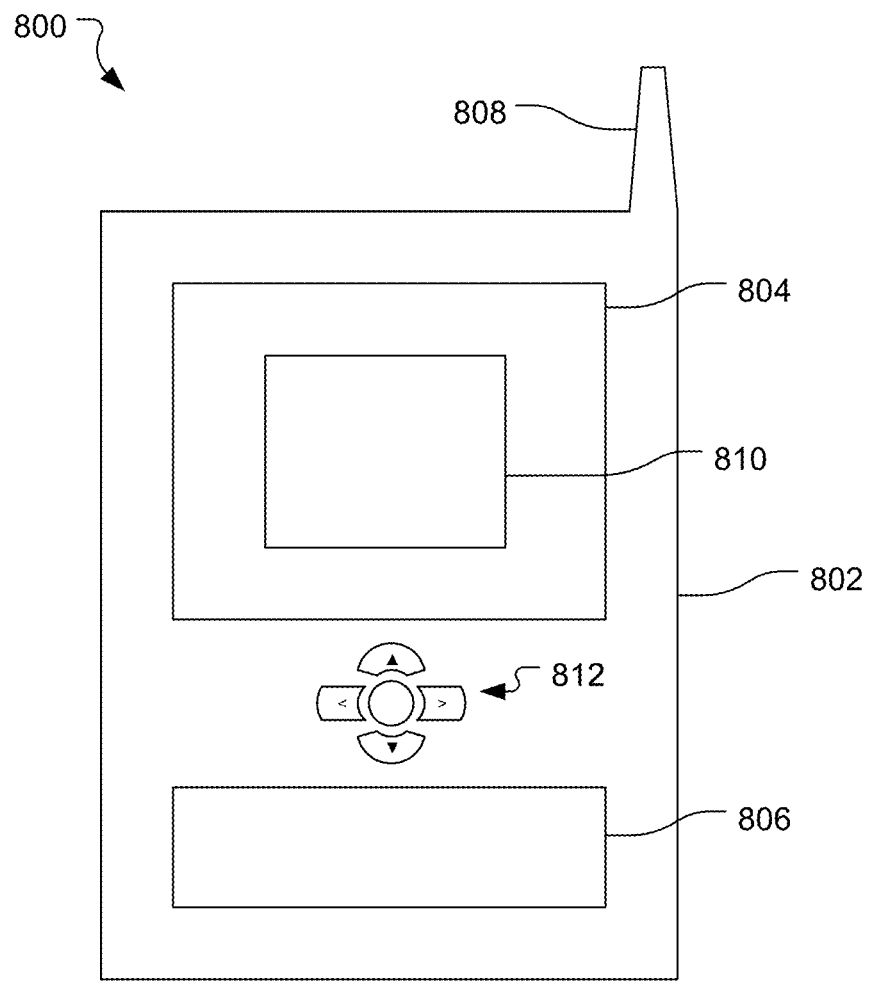
FIG. 15 is a block diagram of an example of a system having a small form factor according to an embodiment.

As described above, the system 700 may be embodied in varying physical styles or form factors. FIG. 15 illustrates embodiments of a small form factor device 800 in which the system 700 may be embodied. In embodiments, for example, the device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 15, the device 800 may comprise a housing 802, a display 804, an input/output (I/O) device 806, and an antenna 808. The device 800 also may comprise navigation features 812. The display 804 may comprise any suitable display unit for displaying information appropriate for a mobile computing device. The I/O device 806 may comprise any suitable I/O device for entering information into a mobile computing device. Examples for the I/O device 806 may include an alphanumeric keyboard, a numeric keypad, a touch pad, input keys, buttons, switches, rocker switches, microphones, speakers, voice recognition device and software, and so forth. Information also may be entered into the device 800 by way of microphone. Such information may be digitized by a voice recognition device. The embodiments are not limited in this context.

Advantageously, the system 700 and/or device 800 may implement one or more aspects of the embodiments described herein. For example, the the system 700 and/or device 800 may implement one or more aspects of the below Examples.

Additional Notes and Examples

Example 1 includes an electronic processing system, comprising a processor, a depth sensor communicatively coupled to the processor, and logic communicatively coupled to the processor and the depth sensor to perform depth sensor fusion to determine depth information for a surface, smooth the depth information for the surface and preserve edge information for the surface based on adaptive smoothing with self-tuning band-width estimation, iteratively remove holes from the surface based on conditional iterative manifold interpolation, reduce one or more of a file size and an on-memory storage size of data corresponding to the surface based on triangular edge contraction, and construct at least a portion of a 3D model based on data corresponding to a visible portion of the surface.

Example 2 includes the system of Example 1, wherein the logic is further to acquire depth signals corresponding to the surface, and distill reduced noise depth signals based on temporal probabilistic analysis of the acquired depth signals.

Example 3 includes the system of Example 1, wherein the logic is further to determine global and local smooth-related strength and scope to adapt image metrics and depth range based on multivariate statistical kernel convolution.

Example 4 includes the system of Example 1, wherein the conditional iterative manifold interpolation is based on a distance transformation and a heuristic-based graph traversal interpolation.

Example 5 includes the system of Example 1, wherein the triangular edge contraction is based on a perceptually-invariant complexity reduction.

Example 6 includes the system of Example 5, wherein the logic is further to collapse edges based on an induced confidence cost factor derived from a fusion stability of each vertex in the surface.

Example 7 includes a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to perform depth sensor fusion to determine depth information for a surface, smooth the depth information for the surface and preserve edge information for the surface based on adaptive smoothing with self-tuning band-width estimation, iteratively remove holes from the surface based on conditional iterative manifold interpolation, reduce one or more of a file size and an on-memory storage size of data corresponding to the surface based on triangular edge contraction, and construct at least a portion of a 3D model based on data corresponding to a visible portion of the surface.

Example 8 includes the apparatus of Example 7, wherein the logic is further to acquire depth signals corresponding to the surface, and distill reduced noise depth signals based on temporal probabilistic analysis of the acquired depth signals.

Example 9 includes the apparatus of Example 7, wherein the logic is further to determine global and local smooth-related strength and scope to adapt image metrics and depth range based on multivariate statistical kernel convolution.

Example 10 includes the apparatus of Example 7, wherein the conditional iterative manifold interpolation is based on a distance transformation and a heuristic-based graph traversal interpolation.

Example 11 includes the apparatus of Example 7, wherein the triangular edge contraction is based on a perceptually-invariant complexity reduction.

Example 12 includes the apparatus of Example 11, wherein the logic is further to collapse edges based on an induced confidence cost factor derived from a fusion stability of each vertex in the surface.

Example 13 includes the apparatus of Example 7, wherein the logic coupled to the one or more substrates includes transistor channel regions that are positioned within the one or more substrates.

Example 14 includes a method of constructing a 3D model of a real object, comprising performing depth sensor fusion to determine depth information for a surface, smoothing the depth information for the surface and preserving edge information for the surface based on adaptive smoothing with self-tuning band-width estimation, iteratively removing holes from the surface based on conditional iterative manifold interpolation, reducing one or more of a file size and an on-memory storage size of data corresponding to the surface based on triangular edge contraction, and constructing at least a portion of a 3D model based on data corresponding to a visible portion of the surface.

Example 15 includes the method of Example 14, further comprising acquiring depth signals corresponding to the surface, and distilling reduced noise depth signals based on temporal probabilistic analysis of the acquired depth signals.

Example 16 includes the method of Example 14, further comprising determining global and local smooth-related strength and scope to adapt image metrics and depth range based on multivariate statistical kernel convolution.

Example 17 includes the method of Example 14, wherein the conditional iterative manifold interpolation is based on a distance transformation and a heuristic-based graph traversal interpolation.

Example 18 includes the method of Example 14, wherein the triangular edge contraction is based on a perceptually-invariant complexity reduction.

Example 19 includes the method of Example 18, further comprising collapsing edges based on an induced confidence cost factor derived from a fusion stability of each vertex in the surface.

Example 20 includes at least one computer readable storage medium, comprising a set of instructions, which when executed by a computing device, cause the computing device to perform depth sensor fusion to determine depth information for a surface, smooth the depth information for the surface and preserve edge information for the surface based on adaptive smoothing with self-tuning band-width estimation, iteratively remove holes from the surface based on conditional iterative manifold interpolation, reduce one or more of a file size and an on-memory storage size of data corresponding to the surface based on triangular edge contraction, and construct at least a portion of a 3D model based on data corresponding to a visible portion of the surface.

Example 21 includes the at least one computer readable storage medium of Example 20, comprising a further set of instructions, which when executed by the computing device, cause the computing device to acquire depth signals corresponding to the surface, and distill reduced noise depth signals based on temporal probabilistic analysis of the acquired depth signals.

Example 22 includes the at least one computer readable storage medium of Example 20, comprising a further set of instructions, which when executed by the computing device, cause the computing device to determine global and local smooth-related strength and scope to adapt image metrics and depth range based on multivariate statistical kernel convolution.

Example 23 includes the at least one computer readable storage medium of Example 20, wherein the conditional iterative manifold interpolation is based on a distance transformation and a heuristic-based graph traversal interpolation.

Example 24 includes the at least one computer readable storage medium of Example 20, wherein the triangular edge contraction is based on a perceptually-invariant complexity reduction.

Example 25 includes the at least one computer readable storage medium of Example 24, comprising a further set of instructions, which when executed by the computing device, cause the computing device to collapse edges based on an induced confidence cost factor derived from a fusion stability of each vertex in the surface.

Example 26 includes a 3D model construction apparatus, comprising means for performing depth sensor fusion to determine depth information for a surface, means for smoothing the depth information for the surface and preserving edge information for the surface based on adaptive smoothing with self-tuning band-width estimation, means for iteratively removing holes from the surface based on conditional iterative manifold interpolation, means for reducing one or more of a file size and an on-memory storage size of data corresponding to the surface based on triangular edge contraction, and means for constructing at least a portion of a 3D model based on data corresponding to a visible portion of the surface.

Example 27 includes the apparatus of Example 26, further comprising means for acquiring depth signals corresponding to the surface, and means for distilling reduced noise depth signals based on temporal probabilistic analysis of the acquired depth signals.

Example 28 includes the apparatus of Example 26, further comprising means for determining global and local smooth-related strength and scope to adapt image metrics and depth range based on multivariate statistical kernel convolution.

Example 29 includes the apparatus of Example 26, wherein the conditional iterative manifold interpolation is based on a distance transformation and a heuristic-based graph traversal interpolation.

Example 30 includes the apparatus of Example 26, wherein the triangular edge contraction is based on a perceptually-invariant complexity reduction.

Example 31 includes the apparatus of Example 30, further comprising means for collapsing edges based on an induced confidence cost factor derived from a fusion stability of each vertex in the surface.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. An electronic processing system, comprising:
   a processor;
   a depth sensor communicatively coupled to the processor; and
   logic communicatively coupled to the processor and the depth sensor to:
      perform depth sensor fusion to determine depth information for a surface,
      smooth the depth information for the surface and preserve edge information for the surface based on adaptive smoothing with self-tuning band-width estimation,
      iteratively remove holes from the surface based on conditional iterative manifold interpolation,
      reduce one or more of a file size and an on-memory storage size of data corresponding to the surface based on triangular edge contraction, and
      construct at least a portion of a 3D model based on data corresponding to a visible portion of the surface.

2. The system of claim 1, wherein the logic is further to:
   acquire depth signals corresponding to the surface; and
   distill reduced noise depth signals based on temporal probabilistic analysis of the acquired depth signals.

3. The system of claim 1, wherein the logic is further to:
   determine global and local smooth-related strength and scope to adapt image metrics and depth range based on multivariate statistical kernel convolution.

4. The system of claim 1, wherein the conditional iterative manifold interpolation is based on a distance transformation and a heuristic-based graph traversal interpolation.

5. The system of claim 1, wherein the triangular edge contraction is based on a perceptually-invariant complexity reduction.

6. The system of claim 5, wherein the logic is further to:
collapse edges based on an induced confidence cost factor derived from a fusion stability of each vertex in the surface.

7. A semiconductor package apparatus, comprising:
one or more substrates; and
logic coupled to the one or more substrates, wherein the logic is at least partly implemented in one or more of configurable logic and fixed-functionality hardware logic, the logic coupled to the one or more substrates to:
perform depth sensor fusion to determine depth information for a surface,
smooth the depth information for the surface and preserve edge information for the surface based on adaptive smoothing with self-tuning band-width estimation,
iteratively remove holes from the surface based on conditional iterative manifold interpolation,
reduce one or more of a file size and an on-memory storage size of data corresponding to the surface based on triangular edge contraction, and
construct at least a portion of a 3D model based on data corresponding to a visible portion of the surface.

8. The apparatus of claim 7, wherein the logic is further to:
acquire depth signals corresponding to the surface; and
distill reduced noise depth signals based on temporal probabilistic analysis of the acquired depth signals.

9. The apparatus of claim 7, wherein the logic is further to:
determine global and local smooth-related strength and scope to adapt image metrics and depth range based on multivariate statistical kernel convolution.

10. The apparatus of claim 7, wherein the conditional iterative manifold interpolation is based on a distance transformation and a heuristic-based graph traversal interpolation.

11. The apparatus of claim 7, wherein the triangular edge contraction is based on a perceptually-invariant complexity reduction.

12. The apparatus of claim 11, wherein the logic is further to:
collapse edges based on an induced confidence cost factor derived from a fusion stability of each vertex in the surface.

13. The apparatus of claim 7, wherein the logic coupled to the one or more substrates includes transistor channel regions that are positioned within the one or more substrates.

14. A method of constructing a 3D model of a real object, comprising:
performing depth sensor fusion to determine depth information for a surface;
smoothing the depth information for the surface and preserving edge information for the surface based on adaptive smoothing with self-tuning band-width estimation;
iteratively removing holes from the surface based on conditional iterative manifold interpolation;
reducing one or more of a file size and an on-memory storage size of data corresponding to the surface based on triangular edge contraction; and
constructing at least a portion of a 3D model based on data corresponding to a visible portion of the surface.

15. The method of claim 14, further comprising:
acquiring depth signals corresponding to the surface; and
distilling reduced noise depth signals based on temporal probabilistic analysis of the acquired depth signals.

16. The method of claim 14, further comprising:
determining global and local smooth-related strength and scope to adapt image metrics and depth range based on multivariate statistical kernel convolution.

17. The method of claim 14, wherein the conditional iterative manifold interpolation is based on a distance transformation and a heuristic-based graph traversal interpolation.

18. The method of claim 14, wherein the triangular edge contraction is based on a perceptually-invariant complexity reduction.

19. The method of claim 18, further comprising:
collapsing edges based on an induced confidence cost factor derived from a fusion stability of each vertex in the surface.

20. At least one computer readable storage medium, comprising a set of instructions, which when executed by a computing device, cause the computing device to:
perform depth sensor fusion to determine depth information for a surface;
smooth the depth information for the surface and preserve edge information for the surface based on adaptive smoothing with self-tuning band-width estimation;
iteratively remove holes from the surface based on conditional iterative manifold interpolation;
reduce one or more of a file size and an on-memory storage size of data corresponding to the surface based on triangular edge contraction; and
construct at least a portion of a 3D model based on data corresponding to a visible portion of the surface.

21. The at least one computer readable storage medium of claim 20, comprising a further set of instructions, which when executed by the computing device, cause the computing device to:
acquire depth signals corresponding to the surface; and
distill reduced noise depth signals based on temporal probabilistic analysis of the acquired depth signals.

22. The at least one computer readable storage medium of claim 20, comprising a further set of instructions, which when executed by the computing device, cause the computing device to:
determine global and local smooth-related strength and scope to adapt image metrics and depth range based on multivariate statistical kernel convolution.

23. The at least one computer readable storage medium of claim 20, wherein the conditional iterative manifold interpolation is based on a distance transformation and a heuristic-based graph traversal interpolation.

24. The at least one computer readable storage medium of claim 20, wherein the triangular edge contraction is based on a perceptually-invariant complexity reduction.

25. The at least one computer readable storage medium of claim 24, comprising a further set of instructions, which when executed by the computing device, cause the computing device to:
collapse edges based on an induced confidence cost factor derived from a fusion stability of each vertex in the surface.

* * * * *